No. 618,697. Patented Jan. 31, 1899.
W. LOEBINGER.
DEVICE FOR INFLATING PNEUMATIC TIRES.
(Application filed Oct. 17, 1898.)
(No Model.)

Witnesses:
E. B. Bolton

Inventor:
Wilhelm Loebinger
By Richards & Co
his Attorneys.

UNITED STATES PATENT OFFICE.

WILHELM LOEBINGER, OF BERLIN, GERMANY.

DEVICE FOR INFLATING PNEUMATIC TIRES.

SPECIFICATION forming part of Letters Patent No. 618,697, dated January 31, 1899.

Application filed October 17, 1898. Serial No. 693,789. (No model.)

*To all whom it may concern:*

Be it known that I, WILHELM LOEBINGER, a citizen of the Empire of Germany, residing at Berlin, in the Empire of Germany, have invented certain new and useful Improvements in Devices for Inflating Pneumatic Tires of Cycles; and I do hereby declare the following to be a full, clear, and exact description of the invention.

This invention has for its object an arrangement for automatically inflating the pneumatic tires of cycles and the like. This arrangement consists of an air-pump of any suitable system mounted on the rotating part of the wheel and permanently connected with the pneumatic tire by means of a flexible pipe, which pump in its rotation encounters with its piston-head a fixed contact-surface on the wheel-fork, thereby causing a movement of the piston which conveys a quantity of air corresponding to the stroke of the piston.

The special purpose of this invention is to prevent the pneumatic tire being too much inflated, so that it could burst. In order to prevent this, special arrangements are made which bring the air-pump out of action when the pneumatic tire has the desired tension.

Figure 1:
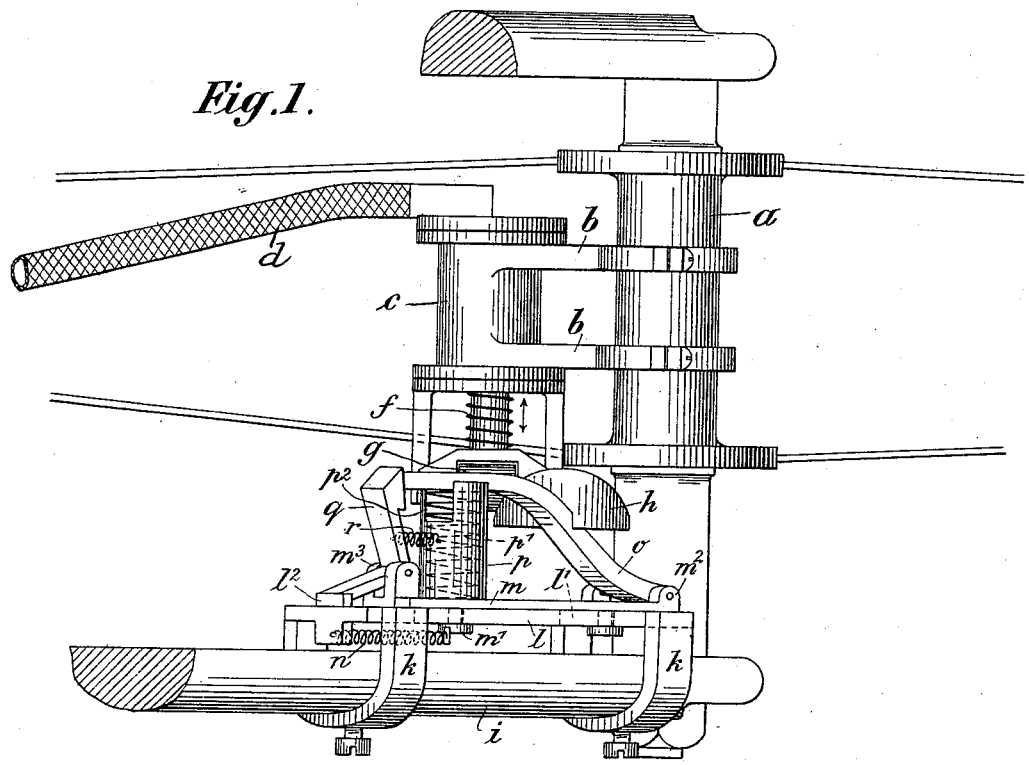
Figure 2:
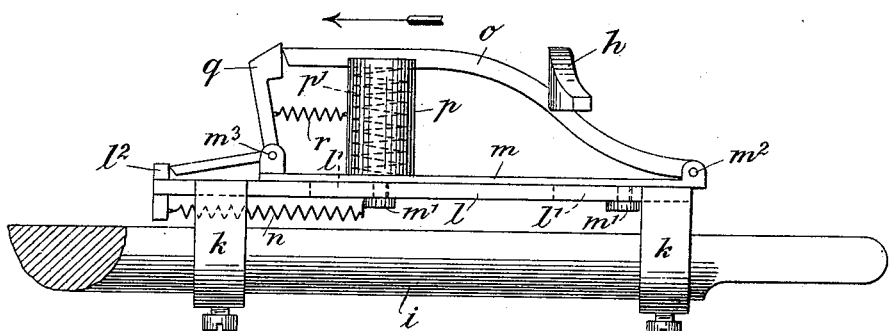

In the drawings forming a part of this application, Figure 1 shows in a plan view the air-pump on the hub of the wheel, with mechanism for operating the pump. Fig. 2 is a front elevation showing the same mechanism for operating the pump.

An air-pump $c$ of any suitable system is mounted on the hub $a$ of the wheel by means of clips or clamps $b$ in such a way that it rotates with the wheel when the latter is moving. The pump $c$ is permanently connected by means of a tube $d$ with the pneumatic tire.

The piston-rod of the pump $c$ is provided at its upper end with a slide-roller $g$, which at each rotation of the wheel travels upon or encounters a cam-disk $h$. By this means at each revolution of the wheel a movement of the piston is produced which conveys to the pneumatic tire a suitable quantity of air, and thus keeps it inflated. Of course a similar arrangement must be fixed on the front wheel as well as on the hind wheel.

In order to prevent the pneumatic tire being inflated beyond a given maximum, a plate $l$ with two or more slits $l'$ is mounted on the fork $i$ of the wheel by means of clips or clamps $k$. A second plate $m$ is movably arranged on the plate $l$, gliding with bolts $m'$ in the slits $l'$ if the spring $n$ is in action. In the point $m^2$ of the plate $m$ a lever $o$ is pivoted, upon which the cam-disk $h$ is mounted for effecting the air-pump when the wheel is moving. The lever $o$ extends by the other end on the spring $p'$, arranged in the chamber $p$. For conducting the lever $o$ and to allow it to press on the spring $p'$ slits $p^2$ are provided in the chamber $p$. At the other end of the plate $m$ in the point $m^3$ a lever $q$ is arranged, lying with one arm against the bolt $l^2$ of the permanently-fixed plate $l$. This arm of the lever $q$ prevents, therefore, the plate $m$ from being moved by the action of the spring $n$ in the direction shown by the arrow. The other arm of the lever $q$ is provided with a spring $r$, fixed with one end at this arm and with the other end at the chamber $p$ or at any other part, which spring tends to draw the lever in Fig. 2 to the right; but this is prevented by the lever $q$ touching with its highest end one end of the lever $o$ and is held, therefore, by the latter in a strained position.

The action of these arrangements is the following: At the rotation of the wheel the roller $g$ of the piston-rod encounters the cam-disk $h$, so that the piston is pressed back against the pressure of the spring $f$, mounted on the piston-rod. Having left the cam-disk $h$ the piston returns by the action of the spring $f$, &c. In such manner the pneumatic tire will be inflated, and the tension of it will be regulated by the spring $p'$, as the tension of it is the maximum pressure for the tire. When the desired tension of the pneumatic tire is obtained, the roller $g$ will press down the lever $o$ with the cam-disk when the wheel rotates. By this pressing down the lever $o$ passes under the overhanging end of the lever $q$. Now the spring $r$ can draw the higher arm of the lever $q$ to the right. The lower arm, lying against the bolt $l^2$, can move upward, and the plate $m$ is now drawn by the spring $n$ in the direction of the arrow, so that the roller $g$ of the piston-rod cannot be touched more by any parts. By such arrangement all noise and loss of power is prevented, which was the chief disadvantage of all similar inventions.

In order to effect the air-pump again for inflating the pneumatic tire, it is necessary only to put the lever $q$ behind the bolt $l^2$ either by hand or by any suitable mechanism.

Having now fully described my invention, what I claim, and desire to secure by Letters Patent, is—

1. In combination with a bicycle, a pump carried by the wheel thereof, a plate slidably supported from the bicycle-frame, a spring exerting tension on said plate, a lever pivoted to said plate and carrying a cam adapted to normally contact with the piston of the pump, a spring bearing against said plate and adapted to yield when the pressure in the tire exceeds a given amount, and a two-armed spring-pressed lever pivoted to said slidable lever engaging a fixed abutment to hold the plate against movement while its other end abuts against the cam-carrying lever, the inward movement of the cam-carrying lever serving to rock the two-armed lever and release the plate whereby the latter moves the cam out of the path of the pump-piston, substantially as described.

2. In combination with a bicycle, a pump carried by the wheel thereof having a spring-pressed piston, a cam movably carried by the frame of the bicycle and normally in the path of said piston, and means for automatically causing said cam to be removed from the path of the pump-piston after the tire has been inflated to the desired amount, substantially as described.

In witness whereof I have hereunto set my hand in presence of two witnesses.

WILHELM LOEBINGER.

Witnesses:
HENRY HASPER,
C. H. DAY.